United States Patent [19]
Hall et al.

[11] Patent Number: 5,912,297
[45] Date of Patent: *Jun. 15, 1999

[54] INTERNALLY STABILIZED VINYLIDENE CHLORIDE RESIN IN AUTODEPOSITION

[75] Inventors: Wilbur S. Hall, Springvale, Me.; Herbert Fischer, Duesseldorf; Roland Morlock, Bergheim, both of Germany

[73] Assignee: Henkel Corporation, Gulph Mills, Pa.

[ * ] Notice: This patent is subject to a terminal disclaimer.

[21] Appl. No.: 08/466,218

[22] Filed: Jun. 6, 1995

Related U.S. Application Data

[63] Continuation of application No. 08/287,643, Aug. 9, 1994, which is a continuation of application No. 07/940,767, Sep. 4, 1992, Pat. No. 5,352,726, which is a continuation of application No. 07/627,897, Dec. 13, 1990, abandoned, which is a continuation of application No. 07/178,625, Apr. 7, 1988, abandoned, which is a continuation of application No. 06/723,677, Apr. 16, 1985, abandoned, which is a continuation-in-part of application No. 06/629,911, Jul. 11, 1984, abandoned, which is a continuation-in-part of application No. 06/517,133, Jul. 25, 1983, abandoned.

[51] Int. Cl.$^6$ .............. C08F 228/02; C08K 3/10
[52] U.S. Cl. ............... 524/547; 427/327; 524/817
[58] Field of Search ............... 524/817, 832, 524/547, 556

[56] References Cited

U.S. PATENT DOCUMENTS

| | | |
|---|---|---|
| 2,744,080 | 5/1956 | Brant et al. . |
| 3,438,926 | 4/1969 | Burke, Jr. et al. . |
| 3,449,302 | 6/1969 | Nachbur et al. . |
| 3,617,368 | 11/1971 | Gibbs ............... 526/287 |
| 3,714,106 | 1/1973 | Smith . |
| 3,736,303 | 5/1973 | Smith et al. . |
| 3,843,581 | 10/1974 | Gibbs et al. . |
| 3,922,451 | 11/1975 | Anschutz et al. ............ 428/35 |
| 4,191,676 | 3/1980 | Hall . |
| 4,229,492 | 10/1980 | Leister et al. ............ 427/345 |
| 4,243,704 | 1/1981 | Hall . |
| 4,411,937 | 10/1983 | Nishida et al. ............ 427/435 |
| 4,544,699 | 10/1985 | Biale ............ 524/512 |

FOREIGN PATENT DOCUMENTS

| | | | |
|---|---|---|---|
| 0071355 | 2/1983 | European Pat. Off. ...... C09D 5/08 |
| 0050235 | 11/1983 | European Pat. Off. ...... C09D 5/02 |
| 1241991 | 8/1971 | United Kingdom . | |
| 1538911 | 1/1979 | United Kingdom ...... C09D 5/12 |
| 1559118 | 1/1980 | United Kingdom ...... B05D 5/00 |

OTHER PUBLICATIONS

GB 1558411.
A.J. Burgess et al., "A new approach to the design of latex paints for the protection of steel," *J. Oil Col. Chem. Assoc.* (1981), 64, 175–185.
D.M. Woodford, "Some Aspects of the Emulsion Polymerisation of Vinylidene Chloride and the Properties of its Copolymers," *Chemistry and Industry* (1966), 316–322.

*Primary Examiner*—Christopher Henderson
*Attorney, Agent, or Firm*—Ernest G. Szoke; Wayne C. Jaeschke; Alexis Barron

[57] ABSTRACT

Improved autodeposited coatings on metallic surfaces are formed by contacting the metallic surfaces with an autodepositing composition comprising an acidic aqueous coating solution containing dispersed solid resin particles of either an internally stablilized or externally stabilized vinylidene chloride polymer, an exemplary internally stabilized polymer being prepared from vinylidene chloride and a monomeric surfactant which includes an inorganic ionizable group, and an exemplary externally stabilized polymer being prepared from vinylidene chloride and a reactive comonomer, the resulting resin particles having surfactant adsorbed thereon, said autodeposited coatings having extremely good corrosion resistant properties without treatment with a reaction rinse such as a chromium rinse.

33 Claims, No Drawings

INTERNALLY STABILIZED VINYLIDENE CHLORIDE RESIN IN AUTODEPOSITION

CROSS-REFERENCE TO RELATED APPLICATION

This is a continuation of U.S. application Ser. No. 08/287,643, filed Aug. 9, 1994, which is a continuation of application Ser. No. 07/940,767, filed Sep. 4, 1992 (now U.S. Pat. No. 5,352,726), which is a continuation of application Ser. No. 627,897, filed Dec. 13, 1990 (abandoned), which is a continuation of application Ser. No. 178,625, filed Apr. 7, 1988 (abandoned), which is a continuation of application Ser. No. 723,677, filed Apr. 16, 1985 (abandoned), which is a continuation-in-part of application Ser. No. 629,911, filed Jul. 11, 1984 (abandoned), which is a continuation-in-part of application Ser. No. 517,133, filed Jul. 25, 1983 (abandoned).

BACKGROUND OF THE INVENTION

1. Field of the Invention

This invention relates to the formation of resinous coatings on metallic surfaces. More specifically, this invention relates to the deposition of improved resinous coatings without need for reaction rinses on metallic surfaces by contacting the metallic surfaces with an acidic aqueous coating solution containing dispersed solid resin particles.

Autodeposition involves the use of an aqueous resinous coating composition of low solids concentration (usually less than about 10%) to form a coating of high solids concentration (usually greater than about 10%) on a metallic surface immersed therein, with the coating increasing in thickness or weight the longer the time the metallic surface is immersed in the composition. Autodeposition is similar to electrodeposition, but does not require the aid of external electrical current to cause the resin particles to deposit on the metal surface. In general, autodepositing compositions are aqueous acid solutions having solid resin particles dispersed therein.

2. Statement of the Related Arts

Acidic aqueous coating solutions having dispersed therein solid resin particles and having the capability of forming on metallic surfaces immersed therein resinous coatings which grow with time are disclosed in various patents.

Autodeposited coatings are disclosed, for example, in U.S. Pat. Nos. 3,585,084; 3,592,699; and 4,373,050, each to Hall and Steinbrecher. The autodepositing compositions disclosed in these patents are aqueous solutions of acid and oxidizing agent, with solid resin particles dispersed therein, particularly a latex combined with hydrofluoric acid and hydrogen peroxide. U.S. Pat. No. 3,709,743 discloses a similar composition comprising an acidic aqueous solution of dispersed resin solids in which the acid component is nitric acid. U.S. Pat. Nos. 4,347,172 and 4,411,937 disclose an improved autodepositing composition comprising hydrofluoric acid, ferric iron, for example, ferric fluoride, and dispersed resin solids. In this process, an oxidizing agent such as peroxide is disclosed as an optional ingredient.

In accordance with the disclosures of the aforementioned patents, autodeposited coatings of the type therein are treated with a solution of chromium compounds prior to curing in order to impart to the coatings corrosion resistant properties which are of an acceptable nature. Such chrome treatments are disclosed in U.S. Pat. Nos. 3,647,567; 3,795,546; and 4,030,945.

Autodeposited coatings with better corrosion resistant properties (up to about 1000 hours of salt spray resistance) which are achieved with a chrome after treatment are disclosed in U.S. Pat. No. 4,313,861. This patent discloses that such improved autodeposited coatings are based on the use in autodepositing compositions of particular acrylic copolymers as the resin component, The acrylic copolymers have a Tg of 2 to 50° C. and are prepared from either methacrylic acid or acrylic acid and at least one other polymerizable ethylenically monounsaturated monomer, and optionally, hydroxyl-containing monomer and/or a vinylenically polyunsaturated monomer.

It has also been recognized that the effectiveness of autodepositing compositions is influenced by surfactant and gegenion concentrations and that the corrosion resistance of autodeposited coatings can be improved by the use of particular resin dispersions. For example, U.S. Pat. No. 4,191,676 discloses an autodepositing composition containing a dispersion of polymer particles in which the surfactant concentration in the aqueous phase is below the critical micelle concentration. A particular class of resins for use in such compositions is prepared by polymerizing: (i) 25 to 70 wt. % of a conjugated diene, for example, butadiene; (ii) 5 to 70 wt. % of a $CH_2$=CHR compound in which R is an aryl or a cyano group, for example, styrene and acrylonitrile; (iii) 1 to 50 wt. % of a vinylidene halide, for example, vinylidene chloride; and (iv) a monoethylenically unsaturated monomer having a functional group, for example, acrylic acid and methacrylic acid. Autodeposited coatings formed from compositions within the scope of the disclosure of this patent and treated with a chromium-containing solution exhibit good corrosion resistance after 240 hours of exposure in standard salt spray tests. U.S. Pat. No. 4,180,603 discloses a coating composition containing epoxy resin solids and a cross-linking resin which when used without a chrome after-treatment produces coating capable of withstanding up to 336 hours of exposure in standard salt spray tests.

Additional, U.S. patents which relate to autodeposition coating include: U.S. Pat. Nos. 3,063,877; 3,776,848; 3,791,431; 3,936,546; 4,108,817; 4,177,180; 4,186,219; and 4,318,944. The foregoing additional patents disclose the use of various polymer latices in autodeposition baths, including acrylates and styrene copolymers.

British patents 1,538,911 and 1,559,118 disclose the use of latices containing up to 55% by weight of vinylidene chloride monomer.

European published patent application 71,355 also discloses autodeposition bath latices containing 70–95% vinylidene chloride and at least one other monomer. The other monomers include: lower alkyl acrylates and methacrylates; their derivatives; alkyl nitrile; vinyl chloride; acrylamide; acrylamide derivatives; vinylsulfonic acid, its salts, and esters; acrylic acid; methacrylic acid; and itaconic acid. However, this publication contains no information regarding the quantity of emulsifier to be used, and there is therefore no teaching of the internal or external stabilization of the resulting vinylidene chloride copolymer. The quantities of emulsifier normally employed in the art are described in the *Encyclopedia of Polymer Science and Technology*, J. Wiley and Sons, Inc. (pub.), New York (1971) at 14:551,553. 1.01% emulsifier is suggested for a latex with 35% solids, and 1.48% emulsifier is suggested for a latex with over 50% solids. H. Barth in *Methoden der Organischen Chemie*, Houben-Weyl, Thieme Verlag (pub.), Stuttgart, Germany (1961) at 14/1:900 specifies an emulsifier quantity of 0.74%. In none of the above instances, is an internally or externally stabilized vinylidene chloride copolymer produced.

SUMMARY OF THE INVENTION

From the present state of the art, as described above, it is evident that there is a need for coating compositions and coating processes capable of producing resinous coatings having a relatively high degree of corrosion resistance which is achieved without a chrome after-treatment, chrome solutions being regarded as an industrial hazard and requiring costly waste treatment. The present invention is directed to an improvement in autodeposited coatings which are formed from resin-containing coating compositions capable of forming continuous films having low moisture and oxygen permeability and which have greater corrosion resistance than has been previously obtainable without the use of a chrome after-treatment. The advantages of this invention include the following.

This invention provides improved autodeposited coatings having corrosion resistant properties of a much higher level than those possessed by autodeposited coatings heretofore known.

This invention further provides autodeposited coatings which can be cured at low temperatures, for example, in the range of about 20° to about 120° C. to yield coatings with physical and chemical properties which are superior to prior art autodeposited coatings.

This invention also provides an autodepositing composition capable of forming an autodeposited coating which does not require the use of chrome after-treatment, particularly, treatment with hexavalent chromium or mixtures of hexavalent and trivalent chromium in aqueous rinse solutions, to achieve a higher order of corrosion resistance than has been possible with the use of prior art autodepositing compositions. The achievement of such a goal would completely eliminate any possible health hazards which might result from the use of such chromium-containing solutions.

This invention still further provides autodeposited coatings with hardness of a higher order than present in autodeposited coatings heretofore known.

This invention also provides autodeposited coatings with superior resistance to solvents, particularly those solvents which frequently cause damage to organic coatings used in the automotive industry.

This invention provides autodepositing compositions which can be applied to metal and which can then be spray rinsed at relatively high pressures without loss of integrity of the freshly applied coatings, that is, coatings which have not been cured or baked to augment their adhesive and/or cohesive properties.

This invention further provides autodeposited coatings which can be cured by immersing in hot water (for example, water at a temperature up to 100° C.) or by spraying with hot water or by steam treating.

Finally, this invention provides a tightly adherent autodeposited coating which will withstand unusually long salt spray and water soak testing.

The present invention comprises the use in an autodepositing composition of dispersed resin solids prepared from vinylidene chloride.

One aspect of the present invention includes an autodepositing composition containing an internally stabilized vinylidene chloride copolymer. The term "internally stabilized" means that the vinylidene chloride-containing polymer includes an ionizable group which is part of the chemical structure of the polymer, that is, a chemically bonded part of the polymer structure. Latexes of such internally stabilized vinylidene chloride-containing polymers can be prepared utilizing little or no surfactant. An example of such a latex, described in detail below, is characterized by having therein particles of resin which are prepared by copolymerizing (A) vinylidene chloride with (B) monomers selected from the group consisting of methacrylic acid, methyl methacrylate, acrylonitrile, and vinyl chloride and (C) a water soluble ionic material which includes an inorganic ionizable group, for example, such as is present in sodium sulfoethyl methacrylate, Another aspect of the present invention includes an autodepositing composition comprising an activating system of hydrofluoric acid and ferric iron and containing a vinylidene chloride copolymer stabilized with an external surfactant, such copolymer containing at least about 50 wt. % vinylidene chloride. In a preferred form of this aspect of the invention, the autodepositing composition is prepared from a latex which contains such copolymer in the form of dispersed resin solids and in which the amount of surfactant is below the critical micelle concentration.

Still another aspect of the present invention includes an autodepositing composition which includes, in the form of dispersed resin solids, a copolymer comprising at least about 50 wt. % of vinylidene chloride, the composition containing little or no surfactant in the aqueous phase.

The present invention includes also the use of autodepositing compositions to form on metallic surfaces autodeposited coatings having improved properties, particularly improved corrosion properties. In the method aspects of this invention, autodeposited coatings having improved corrosion resistance can be formed in the absence of a chrome after-treatment or other type after-treatment designed to improve the corrosion resistant properties or autodeposited coatings.

The present invention relates also to autodeposited coatings which are characterized by being essentially chromium-free, but having, nevertheless, a relatively high degree of corrosion resistance.

The preferred coating composition of the present invention is one in which the particles of resin, as described above are dispersed in an aqueous acidic solution which is prepared by combining, hydrofluoric acid and a soluble ferric iron-containing ingredient, most preferably ferric fluoride.

Coating compositions within the scope of the present invention comprise the use of a particular kind of resin or latex in combination with other ingredients which are effective in providing stable autodepositing compositions that can produce hard, uniform, solvent resistant coatings on steel with an unusually high degree of corrosion resistance. In addition, coating compositions within the scope of the present invention and containing a relatively small amount of resin solids, for example, about 3–8 wt. %, are effective in forming on a metallic surface immersed therein a resinous coating which grows in thickness at a relatively fast rate, producing, for example, a coating having a thickness of as much as 0.5 to 1 mil or more when the metallic surface is immersed in the composition for as short a time as about 90 seconds. As will be seen from examples set forth below, coating compositions within the scope of the present invention can be used to form coatings which have a high degree of corrosion resistance. The ability of the coating composition to coat rapidly has the important advantage of allowing the user to accelerate production rates in that it is possible to produce coatings of desired thicknesses within relatively short periods of time and coatings which also have excellent corrosion resistant properties without the need for a chrome treatment.

Another invention of the present invention is that autodeposited coatings formed pursuant thereto can be cured efficiently by subjecting them to water or steam for a relatively short period of time at a relatively low temperature.

Coating compositions within the scope of the present invention provide coatings with far superior corrosion resistance than could previously be obtained by the use of autodeposition. The corrosion resistance of coatings formed by the present process is so dramatically improved that the process may be used in applications which previously were reserved for coating only by electrodeposition. Coating compositions using vinylidene chloride copolymer in accordance with this invention also permit substantial savings by reducing the typical processing sequence to four stages, and lowering the curing temperature, for example, to 120° C., and lower.

Coatings produced in accordance with the present invention from vinylidene chloride copolymers provide excellent hardness and scratch resistance as well as excellent appearance and solvent resistance.

DETAILED DESCRIPTION OF THE INVENTION

The particular resins, mentioned briefly above and described in detail below, are particularly well suited for use in autodepositing coating compositions and processes of the type described in U.S. Pat. No. 4,191,676 noted above and as modified herein.

Speaking generally, the acidic aqueous coating compositions of the aforementioned type function to attack and dissolve from a metallic surface contacted therewith metal ions in an amount sufficient to directly or indirectly cause resin particles in the region of the metallic surface to deposit thereon in a continuous fashion, that is, in a manner such that there is a buildup in the amount of resin deposited on the surface the longer the time the surface is in contact with the composition. This deposition of the resin on the metallic surface is achieved through chemical action of the coating composition on the metallic surface. The use of electricity which is necessary for the operation of electrocoating methods is not required.

Basic constituents of an autodepositing composition are water, resin solids dispersed in the aqueous medium of the composition and activator, that is, an ingredient(s) which converts the water/resin composition into one which will form on a metallic surface a resinous coating which increases in thickness or weight the longer the surface is immersed in the composition. Various types of activators or activating systems are known, for example, as reported in U.S. Pat. Nos.: 3,592,699; 3,709,743; 4,103,049; 4,347,172; and 4,373,050, the disclosures of which are incorporated herein by reference. The activating system generally comprises an acid/oxidizing system, for example hydrogen peroxide and HF; $HNO_3$; and a ferric-containing compound and HF; and other soluble metal-containing compounds (for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 g/l) and an acid that can be used alone or in combination with hydrofluoric acid, and including, for example, sulfuric, hydrochloric, nitric, and phosphoric acid, and an oranic acid, including, for example, acetic, chloracetic, and trichloracetic.

The preferred activating system comprises a ferric-containing compound and hydrofluoric acid. Thus, a preferred autodepositing composition comprises a soluble ferric-containing compound in an amount equivalent to about 0.025 to about 3.5 g/l ferric iron, most preferably about 30 0.3 to about 1.6 g/l of ferric iron, and hydrofluoric acid in an amount sufficient to impart to the composition a pH within the range of about 1.6 to about 5.0. Examples of the aforementioned ferric-containing compounds are ferric nitrate, ferric chloride, ferric phosphate, ferric oxide, and ferric fluoride,—the last mentioned being preferred.

U.S. Pat. Nos. 4,347,172 and 4,411,937 which disclose the aforementioned type of preferred activating system disclose the optional use in the-composition of an oxidizing agent in an amount to provide from about 0.01 to about 0.2 oxidizing equivalent per liter of composition Suitable oxidizing agents are those commonly known as depolarizers. Examples of oxidizing agents are hydrogen peroxide, dichromate, permanganate, nitrate, persulfate, perborate, p-benzoquinone and p-nitrophenol. Hydrogen peroxide is mentioned as preferred. The preferred composition for use in the present invention does not include the use of an optional oxidizing agent as disclosed in the aforementioned '172 and '937 patents.

With respect to the resin constituent of the autodepositing composition, in accordance with the present invention, and as between the externally and internally stabilized vinylidene chloride-containing resins, the preferred class of resins for use in the present invention is the internally stabilized class. In effect, internally stabilized polymers or resins include as part of their chemical structure a surfactant group which functions to maintain polymer particles or resin solids in a dispersed state in an aqueous medium, this being the function also performed by an "external surfactant", that is, by a material which has surface-active properties and which is adsorbed on the surface of resin solids, such as those in colloidal dispersion. As is known, the presence of an external surfactant tends to increase the water sensitivity of coatings formed from aqueous resin dispersions containing the same and to adversely affect desired properties of the coatings. The presence of undue amounts of surfactant in autodepositing compositions can lead to problems, as described in U.S. Pat. No. 4,191,676, the disclosure of which is incorporated herein by reference, particularly is regards its description respecting surfactants and amounts thereof in autodepositing compositions. As discussed in this patent, the presence of an undue amount of surfactant in autodepositing compositions can deter the build-up of resin particles on the metallic surface being coated. In addition, the presence of undue amounts of surfactant can also adversely affect desired coating properties, for example, corrosion resistant properties. An advantage of internally stabilized vinylidene chloride-containing polymers is that stable aqueous dispersions, including acidic aqueous dispersions of the type comprising autodepositing compositions, can be prepared without utilizing external surfactants. (It is noted that there is a tendency in the literature to use interchangeably the following terms in connection with describing surface active materials which are used in polymerization processes for preparing polymers of the type to which the present invention relates: surfactant, wetting agent, emulsifier or emulsifying agent and dispersing agent. As used herein, the term "surfactant" is intended to be synonymous with the aforementioned.) Various types of internally stabilized vinylidene chloride-containing polymers are known and species thereof are available commercially. In accordance with the present invention, they can be used to excellent advantage in realizing important improvements in the field of autodeposition.

Various surfactants which function to maintain polymeric particles in dispersed state in aqueous medium include organic compounds which contain ionizable groups in which the anionic group is bound to the principal organic moiety of the compound, with the cationic group being a constituent such as, for example, hydrogen, an alkali metal, and ammonium. Speaking generally, exemplary anionic groups of widely used surfactants contain sulfur or phosphorus, for example, in the form of sulfates, thiosulfates, sulfonates, sulfinates, sulfaminates, phosphates, pyrophosphates and phosphonates. Such surfactants comprise inorganic ionizable groups linked to an organic moiety.

Although various ways may be used to introduce into the molecular structure of the vinylidene chloride resin such ionizable groups, it is believed that the most widely used method for preparing such resins will involve reacting vinylidene chloride with a monomeric surfactant and optionally one or more other monomers, In such reaction, the monomeric surfactant comprises a material which is polymerizable with monomeric vinylidene chloride or with a monomeric material which is polymerizable with monomeric vinylidene chloride and which is ionizable in the reaction mixture and in the acidic aqueous medium comprising autodepositing compositions.

With respect to particular resins that can be used in the coating composition of the present invention, a preferred class can be prepared by copolymerizing (A) vinylidene chloride monomer with (B) monomers such as methacrylic acid, methyl methacrylate, acrylonitrile, and vinyl chloride and (C) a water soluble ionic material such as sodium sulfoethyl methacrylate. Although the constituents comprising the above-desired resin can vary over a relatively wide range, in general the resin will comprise the polymerized constituents in the following amounts:

1) between 45 and about 99 weight percent based on the total weight of monomers used of vinylidene chloride monomer;
2) from about 0.5 to 30 weight percent based on the total weight of (1) and (2) of a second relatively more hydrophilic ethylenically unsaturated monomeric material wherein such monomeric material has a solubility in both the water phase and the oil phase of the polymer latex of at least 1 weight percent at the temperature of polymerization; and
3) from about 0.1 to about 5 weight percent based on the total weight of other monomers of an ionic significantly water-soluble material which is copolymerizable with (2) and is selected from the group of sulfonic acids and their salts having the formula:

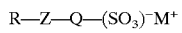

Examples of resins prepared from such monomers are disclosed in U.S. Pat. No. 3,617,368. As disclosed in this patent, the radical "R" is selected from the group consisting of vinyl and substituted vinyl, for example, alkyl-substituted vinyl; the symbol "Z" represents a difunctional linking group which will activate the double bond in the vinyl group; —Q— is a divalent hydrocarbon having its valence bonds on different carbon atoms; and the symbol "$M^+$" represents a cation.

The relatively hydrophilic monomers of (2) above include those materials which are readily copolymerizable with (1) in aqueous dispersion, that is, which copolymerize within a period of about 40 hours at a temperature ranging from the freezing point of the monomeric serum up to about 100° C., and which have a solubility in both the water and the oil phase of the polymer latex of at least 1 weight percent at the temperature of polymerization. Exemplary of preferred materials, particularly when used in conjunction with monomeric vinylidene chloride are: methacrylic acid and methyl methacrylate. Other monomers which may be advantageously employed include the hydroxyethyl and propyl acrylates, hydroxyethylmethacrylate, ethyl hexylacrylate, acrylic acid, acrylonitrile, methacrylonitrile, acrylamide, and the lower alkyl and dialkylacrylamides, acrolein, methylvinyl ketone, and vinyl acetate.

These monomers, which can be employed in amounts of from 0.5 to 30 weight percent, based on the total weight of the nonionic monomers used, provide for the necessary reactivity with the copolymerizable ionic material of (3) and also provide for the required water solubility of the interpolymer in water. Thus, such materials may be referred to as "go-between" monomers. It is to be understood that the optimum amount of such relatively hydrophilic monomers may vary somewhat within the prescribed range depending upon the amount of hydrophobic monomer used in preparing the resin, as well as upon the amount and type of the copolymerizable ionic monomer used.

The copolymerizable ionic monomers used in preparing the aforementioned type resins are those monomeric materials which contain in their structure both an ionizable group and a reactive double bond, are significantly soluble in water, are copolymerizable with the hydrophilic monomer constituent (2) and in which the substituent on the double bond is chemically stable under the conditions normally encountered in emulsion polymerization. Examples of the difunctional linking group (Z) which will activate the double bond present in the vinyl group include groups of the structure:

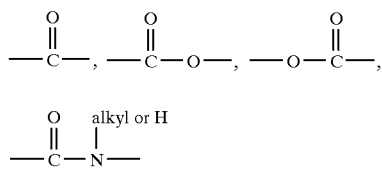

and the like The alkyl group is preferably alkyl of 1 to 8 carbon atoms, especially methyl, ethyl or propyl. Examples of the aforementioned divalent hydrocarbon having its valence bonds on different carbon atoms include alkylene and arylene divalent hydrocarbon radicals. Although the alkylene ($CH_2$) group can contain up to about 20 carbon atoms, it will generally have 1 to about 8 carbon atoms.

The solubility of the defined copolymerizable ionic material as described herein is strongly influenced by the cation $M^+$. Exemplary cations are the free acids, alkali metal salts, ammonium and amine salts and sulfonium and quaternary ammonium salts. Preferred are the free acids, alkali metal salts, particularly sodium and potassium, and ammonium salts.

It is further noted that, with one of the ions above, and the usual choices for R and Z, the solubility of the monomer depends on Q. As indicated, this group can be either aliphatic or aromatic and its size will determine the hydrophilic/hydrophobic balance in the molecule, that is, if Q is relatively small, the monomer is water soluble, but as Q becomes progressively larger the surface activity of such monomer increases until it becomes a soap and ultimately a water insoluble wax. It is to be understood, however, that the limiting size of Q depends on R, Z, and $M^+$. As exemplary of the above, it has been found that sodium sulfoalkyl methacrylate of the formula:

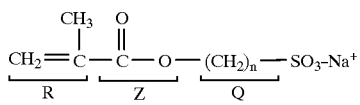

wherein n is 2, is a highly acceptable copolymerizable ionic material for use in the present invention.

Further, the selection of R and Z is governed by the reactivity needed and the selection of Q is usually determined by the reaction used to attach the sulfonic acid to the base monomer (or vice versa).

Processes for preparing latexes containing resins of the aforementioned type are known, such latexes being commercially available and being referred to herein as "self-stabilizing latexes", that is, latexes, the polymeric particles of which contain in the polymer molecule functional groups that are effective in maintaining the polymeric particles dispersed in the aqueous phase of the latex. As mentioned above, such latexes do not require the presence of an external surfactant to maintain the particles in their dispersed state. Latexes of this type generally have a surface tension very close to that of water (about 72 dynes/cm). It has been observed that autodepositing compositions containing such latexes form coatings which build up at a relatively fast rate.

An exemplary method for preparing such latexes involves preparation of an aqueous dispersion by an essentially continuous, carefully controlled addition of the requisite polymerization constituents (including polymerization initiator systems, if desired) to the aqueous medium. In such process, it is often preferred to first add a small amount of the monomeric materials to the aqueous medium having the desired pH value, followed by the subsequent addition of the necessary polymerization initiator, to form a polymeric seed latex in order to aid in the control of particle size. When forming such polymeric seed latexes, very small amounts of conventional surfactants, such as alkali soaps or the like, may be incorporated in the aqueous medium to further aid in the attainment of particles of desired size. The addition of such surfactants, however, is not critical for the production of the highly stable, internally stabilized, aqueous colloidal dispersions of polymeric particles of the type described above. In any event, additions of surfactants are limited so that the total amount present in the aqueous phase of the final coating solution is less than the critical micelle concentration, as taught in aforementioned U.S. Pat. No. 4,191,676. Following the formation of the polymeric seed latex, the remaining polymerization constituents are simultaneously and continuously added under carefully controlled conditions to the aqueous medium.

Highly stable polymer latexes for use in the present invention are characterized by the virtual absence of undesirable coagulum which often results when polymeric latexes are stabilized by conventional water soluble surfactants. Thus, such latexes combine the highly beneficial properties of optimum colloidal stability, reduced viscosities at relatively high polymer solids content, low foaming tendencies and excellent product uniformity and reproducibility. Such highly stable latexes which are internally stabilized are disclosed, for example, in aforementioned U.S. Pat. No. 3,617,368.

A preferred embodiment of this invention comprises the use of vinylidene chloride-containing latexes in which a water soluble ionic material such as, for example, sodium sulfoethyl methacrylate is copolymerized with the comonomers comprising the copolymer. Sodium sulfoethyl methacrylate is particularly effective for use with monomeric vinylidene chloride and the relatively hydrophilic monomers methyl methacrylate or methacrylic acid when user in the amounts and in the manner called for by the present invention.

Particularly preferred latexes for use in this invention are latexes with about 35 to about 60 weight % solids comprising a polymeric composition prepared by emulsion polymerization of vinylidene chloride with one or more comonomers selected from the group consisting of vinyl chloride, acrylic acid, a lower alkyl acrylate (such as methyl acrylate, ethyl acrylate, butyl acrylate), methacrylic acid, methyl methacrylate, acrylonitrile, methacrylonitrile, acrylamide, and methacrylamide and stabilized with sulfonic acid or sulfonic acid salt of the formula:

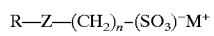

wherein represents vinyl or lower alkyl-substituted vinyl, Z represents one of the functional groups:

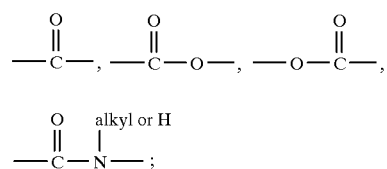

n is an integer from 1 to 20 (preferably 1 to 6) and $M^+$ is hydrogen or an alkali metal cation, preferably sodium or potassium.

A subgroup of preferred polymers are those having at least about 50% by weight of vinylidene chloride, but less than about 70%, and about 5 to about 35% vinyl chloride, and about 5 to about 20% of a vinyl compound selected from the group consisting of acrylic acid, methyl acrylate, ethyl acrylate, butyl acrylate, methacrylic acid, methyl methacrylate, acrylonitrile, methacrylonitrile, acrylamide and methacrylamide, and combinations thereof, and about 1 to about 3% by weight of sulfoethyl methacrylate.

A particularly preferred group of latexes, however, are latexes containing about 30 to about 70 weight % or solids formed by emulsion polymerization of about 50 to about 99% vinylidene chloride based on total weight of polymer and about 0.1 to about 5% by weight of sulfoethyl methacrylate, with optionally other comonomers selected from the group consisting of vinyl chloride, acrylic and methacrylic monomers such as acrylonitriles, acrylamides, methacrylamides and mixtures thereof in amounts between about 5 and about 50% by weight, and substantially free of unpolymerized surfactant or protective colloid.

Among other preferred subclasses of resin for use in this invention are dispersions of copolymers of about 50 to about 90% by weight vinylidene chloride, about 5 to about 30% by weight of butyl acrylate and about 1 to about 2% by weight of sulfoethyl methacrylate based on the total weight of polymer. Another preferred subclass of polymers are the latexes of vinylidene chloride-containing polymers internally stabilized with sulfoethyl methacrylate and free of surfactant, and including optionally vinyl chloride and one or more acrylic comonomers.

Another preferred vinylidene chloride-containing copolymer is one comprising about 15 to about 20 weight % vinyl chloride, about 2 to about 5 weight % butyl acrylate, about 3 to about 10 weight % acrylonitrile, about 1 to about 2 weight % sulfoethyl methacrylate. This particular copolymer will have less than 70% by weight vinylidene chloride copolymer based upon total weight of comonomers (including the sulfoethyl methacrylate) used in the emulsion polymerization.

In its most preferred form, the present invention comprises the use of internally stabilized vinylidene. chloride-containing resins of the type used in Example 1 reported hereinbelow. Such resins are of relatively high crystallinity. Exemplary crystalline resins are described in U.S. Pat. No. 3,922,451 and aforementioned U.S. Pat. No. 3,617,368. Generally speaking, crystalline vinylidene chloride-containing resins comprise a relatively high proportion of vinylidene chloride, for example, at least about 80 wt. % thereof.

Although internally stabilized vinylidene chloride-containing resins are preferred for use in the practice of the present invention, vinylidene chloride-containing resins stabilized with external surfactants can also be used. The use of such resins forms autodeposited coatings which exhibit chemical and physical properties superior to those of autodeposited coatings prepared from resins heretofore known in the state of the art. The externally stabilized vinylidene chloride-containing resins contain a high proportion of vinylidene chloride, that is, at least about 50 wt. %, and preferably in excess of 50 wt. %. The amount of vinylidene chloride comprising the resin should be less than 100 wt. % for the reason that the pure homopolymer of vinylidene chloride is thermally unstable. It undergoes dehydrochlorination, that is, an "unzippering" depolymerization which leads to complete breakdown of the polymer. The proclivity for thermal instability can be greatly reduced by copolymerizing the vinylidene chloride monomer with comonomers, for example, acrylic comonomers, which can be used to break up the length of the vinylidene chloride sequences by inserting more thermally stable comonomers into the chain thereby preventing further unzippering. In simplistic terms, the use of comonomers in vinylidene chloride polymers is akin to jamming a zipper at a number of points which prevents it from opening more than a short distance.

Examples of monomers that can be copolymerized with vinylidene chloride to form a thermally stable copolymer include one or more of vinyl chloride, acrylic acid, methacrylic acid, methylacrylate, methyl methacrylate, ethylacrylate, butylacrylate, acrylonitrile, methacrylonitrile, acrylamide and methacrylamide. A few examples of externally stabilized vinylidene chloride polymers that can be used in the practice of the present invention are the following: (A) about 50 to about 90 wt. % vinylidene chloride, about 5 to about 20 wt. % acrylonitrile and about 5 to about 20 wt. % butyl acrylate; (B) about 60 to about 76 wt. % vinylidene chloride, about 4 to 10 wt. % ethylhexyl acrylate or methacrylate, and about 1 to about 4 wt. % acrylic acid; and (C) 66 wt. % vinylidene chloride and 34 wt. % vinyl chloride. In preferred form, the externally stabilized vinylidene chloride-containing resin is crystalline in nature.

Externally stabilized resins of the above type are prepared typically by emulsion polymerization utilizing a sufficient amount of surfactant to maintain the resulting resin particles in a dispersed state in the aqueous medium of the reaction mixture. The nature of this resin type is that the structure of the polymer molecule requires that surfactant be present to maintain the colloidal dispersion of the resulting latex, the surfactant being adsorbed on the surface of the resin particles.

Examples of surfactants (emulsifiers) that can be used to prepare such latexes are: sodium dodecylbenzene sulfonate, alkyl sulfates, sodium dioctyl sulfosuccinate, alkylphenolicethoxylate sulfonates, sodium dodecyldiphenyl oxide disulfonate, sodium oleoyl isopropanolamide sulfosuccinate, and sodium lauryl sulfate. These surfactants or emulsifiers are exemplary only; accordingly, it should be understood that the practice of this invention is not limited to latexes containing the aforementioned surfactants. For example, there can be used any anionic surfactant which will lower the interfacial tension between the monomeric reactants and water sufficiently to result in the formation of stable colloidal dispersions of the monomers in the water and, in addition, is stable in autodepositing compositions formulated therefrom. It is noted further that the activating system (for example, acid and oxidizer) of the autodepositing composition functions to dissolve from the metallic substrate positively charged cations which cause the negatively charged latex polymer particles to autodeposit on the metallic surface. The anionic surfactant should be a material which functions accordingly. Mixtures of two or more suitable anionic surfactants may be used.

For reasons mentioned above, and as explained in aforementioned U.S. Pat. No. 4,191,676, the surfactant concentration of externally stabilized latexes should be relatively low so that the aqueous phase of the autodepositing composition has a surfactant concentration below the critical micelle concentration and preferably below the surfactant concentration which corresponds to the inflection point on a graph of surface tension versus the logarithm of surfactant concentration in the composition, as referred to in the aforementioned '676 patent. Accordingly, it is preferred that the latex containing the externally stabilized resin be prepared by emulsion polymerization with a very low concentration of surfactant. In the present state of the art, this is best achieved by seed polymerization or semicontinuous polymerization as opposed to batch emulsion polymerization. In the seed Polymerization process or semicontinuous polymerization, the amount of surfactant can be limited by adding surfactant and monomer in such a manner that the monomer continues to polymerize with particles already present rather than forming new particles. This gives greater uniformity of particle size distribution and also gives good control of the total amount of surfactant in the latex. The stability of the colloidal latex can be partially attributed to charged polymer end groups whose provenance is the polymerization initiator.

In general, such latexes will have a relatively high surface tension, that is, at least about 40 dynes/cm. Such latexes can be used in the practice of the present invention, and preferably, there are used such latexes that have a surface tension of about 55 to 70 dynes/cm. In particular, such latexes in which there is no protective colloid are preferred class for use in the present invention.

Polymers having a vinylidene chloride content of between about 50 wt. % and about 90 wt. % or higher, based upon the total weight of polymer, can be used. When vinyl chloride is employed as one of the co-monomers, the vinylidene chloride content can be less than about 70 wt. %. The total chloride content, however, is preferably 50 wt. % or more based on total polymer weight. Generally speaking, the internally stabilized latexes which are the preferred class of latexes according to this invention can be used at even lower chloride contents, thereby enabling the inclusion of other copolymers to enhance the desirable polymer characteristics such as hardness, gloss, solvent resistance and the like, in addition to corrosion resistance attributable to reduced vapor permeability.

Latexes for use in the composition of the present invention are available commercially. Examples of such latexes are the Saran latexes such as, for example, Saran 143 and Saran 112 available from Dow Chemical Co., the Serfene latexes available from Morton Chemical, and the Haloflex latexes such as, for example, Haloflex 202 available from Imperial Chemicals Industries.

If desired, the autodepositing composition can be prepared from two or more latexes containing different resins. Such a composition will comprise a blend of the vinylidene chloride-containing polymers described above, typically in an amount of about 50 to about 95% of the total resin solids, and one or more other latexes including, for example, styrenebutadiene resins, poly(vinyl chlorides), acrylic resins and the like.

The amount of the resin comprising the coating composition of the present invention can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the amount of resin particles in the composition, the heavier the coating formed, other factors being the same. Although coating compositions can be formulated with a range of about 5 to about 550 g/l of resin solids, the amount of the resin solids will tend to vary depending on the other ingredients comprising the composition and also on the specific latex or resin used. For many applications, good results can be achieved utilizing about 50 to about 100 g/l of resin solids in the composition.

Optional ingredients can be added to our compositions desired. For example, it is believed that the composition of the present invention will be used most widely in application where it is desired to apply pigmented coatings to the metallic substrate. For this purpose, suitable pigments can be included in the composition. Examples of pigments that can be used are carbon black, phthalocyanine blue, phthalocyanine green, quinacridone red, benzidene yellow and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using an aqueous dispersion in an amount such that the composition contains about 0.2 to about 3 g of furnace black/100 g of resin solids.

Many pigments are available in aqueous dispersions which may include surfactants or dispersing agents for maintaining the pigment particles in dispersed state. When utilizing such pigment dispersions in the composition of the present invention, they should be selected so that the surfactant concentration in the aqueous phase of the composition is below the CMC, preferably below the surfactant concentration which corresponds to the inflection point on a graph of surface tension versus the logarithm of surfactant concentration in the composition. The surfactant should preferably be selected from those indicated above with respect to the preparation of the externally stabilized latexes. Suitable pigmented compositions are illustrated in examples herein.

Colored coatings can be produced also by the use of dyes, examples of which include rhodamine derived dyes, methyl violet, safranine, anthraquinone derived dyes, nigrosine, and alizarin cyanine green. These are but a few examples of dyes that can be used.

Examples of other additives that may be used in the autodepositing composition are those generally known to be used in formulating paint compositions, for example, UV stabilizers, viscosity modifiers, etc.

If a surfactant is added to the composition, either as a component of the latex, or with a pigment dispersion, or with other ingredients or additives, the total amount of surfactant in the aqueous phase of the composition should be maintained below the CMC. Preferably, the aqueous phase of the composition contains little or no surfactant.

In case a surfactant is utilized, the preferred surfactants are the anionic surfactants. Examples of suitable anionic surfactants are the alkyl, alkyl/aryl or naphthalene sulfonates, for example, sodium dioctylsulfosuccinate and sodium dodecylbenzene sulfonate.

In preparing the autodepositing composition of the present invention, the constituents thereof can be admixed in any suitable way, for example, as described in aforementioned U.S. Pat. No. 4,191,676. In preparing a bath of pigmented coating composition for use on an industrial scale, it is preferred that the bath be prepared by admixing:

A) an aqueous concentrate comprising about 350 to about 550 g/l of the aforementioned vinylidene chloride-containing resin particles and about 10 to about 550 g/l of pigment; and B) an aqueous concentrate prepared from about 0.4 to about 210 g/l of HF and a water soluble ferric-containing compound in an amount equivalent to about 1 to about 100 g/l of ferric iron.

The bath can be prepared by stirring water into concentrate (A) and thereafter admixing therewith the required amount of concentrate (B) with stirring to provide a homogenous composition.

Various steps of the overall coating process in which the autodepositing composition of the present invention is used can be like those of the prior art, except as noted below. For example, cleaning of the metallic surface prior to coating and any water rinse steps effected subsequent to the cleaning step can be in accordance with the teachings of aforementioned U.S. Pat. No. 4,191,676. With respect to contacting the metallic surface with the autodepositing composition, it is believed that, for most applications, desired coating thicknesses can be obtained by immersing the metallic surface in the composition for a period of time within the range of about 30 seconds or even less to about 3 minutes. Good results have been achieved utilizing a time of immersion of not more than about 90 to about 100 seconds with compositions containing about 5 to about 10 wt. % of resin solids. However, it should be understood that longer or shorter periods of time can be used. Agitating the composition aids in maintaining it uniform and in improving the uniformity of the coatings formed. Other factors held constant, heating of the composition will result in heavier coatings. However, satisfactory results can be obtained by operating the coating process at ambient temperature.

As is illustrated in examples reported below, coating compositions within the scope of the present invention are effective in forming coatings which upon being immediately withdrawn from the coating composition are initially tightly adherent to the metallic substrate. For example, such coatings resist being removed from the substrate when they are rinsed by spraying water under pressure against the coated surface, as for example, is shown in examples below.

Water rinsing the coated surface after it has been withdrawn from the composition, and before significant drying takes place is effective in removing therefrom residuals such as acid and other ingredients of the composition that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. Further, the residuals can be removed or rendered unreactive by treatment with an alkaline solution suitably a mild alkaline solution, for example, a solution of about 0.1 to about 2 g/l of caustic. If removal of residuals is not necessary to the finish required, this step of removing them can be avoided.

Upon partially or completely air drying or baking the coating, the superficial layer of unreacted coating composition adheres to the underlying and initially adherent coating in a manner such that it is capable of withstanding water rinsing. Resinous coatings formed in accordance with the present invention can be cured by air drying at room temperature for sufficient time, though an elevated temperature is desirable to effect a thorough cure in practical times.

Following any rinse steps employed after the coated surface is withdrawn from the composition, the coating should be cured. Fusion of the resinous coating renders it continuous, thereby improving its resistance to corrosion and its adherence to the underlying metallic surface.

The conditions under which the curing and/or fusion operation is carried out depend somewhat on the specific resin employed. In general, it is desirable to apply heat to fuse the resin although, as noted above, resins of the type employed in this invention can be cured at room temperature. Generally the corrosion resistant, hardness, and solvent resistant properties of coatings fused at elevated temperatures have been observed to be better than coatings which have been air dried. However, there are applications where air dried coatings can be used satisfactorily. The fusion of the coating should be carried out under temperature and time conditions which do not adversely affect the desired properties of the coating. Exemplary conditions used in fusing coatings producer according to the present invention are temperatures within the range of about 20° C. to 120° C. for periods of time within the range of about 10 to about 30 minutes, depending on the mass of the coated part. Baking the coating for a period of time until the metallic surface has reached the temperature of the heated environment has been used effectively.

When baked in an oven, the coating reaches the proper "curing" or heating temperature for the full development of coating properties when the metal part reaches that temperature. For this reason, parts that are constructed of thicker steel require longer times to reach the required temperature. For massive parts, it may not be possible to reach the required temperature without deleteriously affecting the coating and causing it to degrade.

In some cases, it is possible to overcome this problem by resorting to infrared radiation curing. In this case, it is possible to cure the coating without simultaneously raising the temperature of the metal to the required temperature. However, infrared radiation curing is practicable only for simple geometric shapes since the area to be cured must be exposed to the infrared. In using infrared radiation curing, all coated surfaces must be visible to the infrared source, that is, the entire coated surface must "see" the infrared.

Autodeposited coatings of the type described above, can be "cured" or heated to such a degree that those properties which depend upon proper bake schedule, such as, for example, corrosion resistance, adhesion, and hardness can be readily achieved, even on massive parts, as well as relatively thin wall parts, by the simple expedient of treating the freshly coated part with hot water or steam. Exemplary treating means include spraying the freshly applied coating with hot water, immersing the freshly coated part in hot water and exposing the freshly deposited coating to an atmosphere of steam. Utilizing the present invention, heat can be transferred more quickly into the coated mass with the result that the temperatures needed for full development of coating properties are reached more quickly than they are reached when heating the coated part in air.

The curing of autodeposited coatings in general, including autodeposited coatings of the type described above, is the subject of U.S. patent application, Ser. No. 06/629,924 filed Jul. 11, 1984 now U.S. Pat. No. 4,562,098 in the name of Bashir M. Ahmed, and entitled "Water or Steam Cure of Autodeposited Coatings". The disclosure of said application, as it pertains to the autodeposited coatings described therein and the water or steam curing thereof, is incorporated herein by reference. As disclosed in said application, the types of autodeposited coatings that particularly lend themselves to being so cured are those comprising resins which develop fully their coating properties at the elevated temperatures used, that is, temperatures up to 212° F. in the case of water and steam at atmospheric pressure, and higher temperatures in the case of super heated steam, and which are not degraded at such temperatures. As also disclosed in said application, it is believed that such a curing process will be used most widely in curing autodeposited coatings comprising resins which have a minimum film temperature (MFT) or glass transition temperature (Tg) of no greater than about 140° F., prefereably no greater than about 100° F., and most preferably no greater than about 85° F. Vinylidene chloride-containing resins within the scope of the present invention can have Tg's within the range of about 30° F. to about 85° F. They can also have an accelerated cure temperature of no greater than about 300° F. With respect to resins having a Tg well below room temperature, improvements can be realized by curing with water having a temperature of at least 70° F.

Resins which do not inherently have Tg's or MFT's in the desired range can be modified by the use of solvents or plasticizers in accordance with the state of the art to reduce their Tg and MFT values appropriately.

The temperature and time of treatment of the autodeposited coating will depend upon the nature of the particular resin comprising the coating. The treating conditions should be selected so that the properties of the coating are fully developed and so that the coating is not affected adversely. Exemplary conditions include treating times of about 5 seconds to about 5 minutes (although longer times can be used) at temperatures within the range of about 185° F. to about 212° F. (although higher temperatures can be used in the case of super heated steam). It is believed that many applications will require no more than about 2 to 3 minutes and even less time of pretreatment when using temperatures within the aforementioned range. Particularly, in the case of steam, there may be many applications in which the treating time is less than 5 seconds. Autodeposited coatings comprising vinylidene chloride-containing resins of the type described above can be properly heated or "cured" to achieve full development of coatings properties by immersion of the freshly formed autodeposited coating into hot water for as little as about 5 to about 30 seconds at temperatures of about 185° F. to about 212° F.

Steam curing has a number of advantages over the "hot water cure" method described-above. One advantage accruing to the use of a steam atmosphere for curing the freshly formed coating is that the parts need not be immersed. This is important when parts are being processed on a conveyer line. In order to immerse a part in hot water, the conveyor line must change directions as the part is carried down into a tank of hot water. Once the part has been "cured", the conveyor must then change directions again to remove the part from the hot water tank. By the use of steam to effect curing of the autodeposited coating, the conveyor simply carries the parts into a tunnel which contains the steam. There is no need for the conveyor to change directions as in an immersion process.

A further advantage accruing to the use of steam for curing autodeposited coatings is that steam has a higher calorific value than does hot water. For example, a gram of steam at 212° F. has a higher heat content than a gram of water at the same temperature. This provides a greater energy source for transferring energy rapidly to the freshly formed autodeposited coating. Still another advantage accruing to the use of steam is that only a relatively small amount of water need be converted to steam as opposed to raising the temperature of an entire tank of water to the operating temperature.

The steps of rinsing the freshly formed autodeposited coating to remove therefrom residuals and curing of the coating can be combined into one step. Thus, for example, rinsing and curing can be done simultaneously by spraying with hot water or immersing the freshly formed autodeposited coated surface in a water bath. In addition, the water or steam cure process can be used in combination with heretofore known curing methods. For example, a short treating time in accordance with the curing method of the present invention can be used to quickly heat the coating (which surprisingly can result in drying of the coating) followed by baking.

An important characteristic of the vinylidene chloride-containing coatings of the present invention is that they exhibit extraordinary corrosion resistance without the use of treatments which are designed to increase the corrosion resistance of autodeposited coatings. Examples of such treatments include rinsing the freshly applied coating with aqueous solutions of chromium compounds or with aqueous solutions of phosphoric acid. For example, as previously noted, U.S. Pat. Nos. 3,795,546 and 4,030,945 disclose methods of treating freshly formed autodeposited coatings with aqueous rinse solutions containing hexavalent chromium or aqueous solutions containing mixtures of hexavalent chromium and formaldehyde-reduced forms of hexavalent chromium or to improve the corrosion resistance of the autodeposited coatings. U.S. Pat. No. 3,647,567 discloses the use of chromium-containing solutions and also the use of an aqueous solution of phosphoric acid. Although uncured coatings formed in accordance with the present invention can be treated with compositions designed to improve the corrosion resistance of cured autodeposited coatings, cured coatings within the scope of the present invention possess unusually high corrosion resistant properties without being so treated.

It is generally believed that corrosion of coated metal surfaces occurs when moisture permeates the protective coating and permits the transport of electrons or ions between microcathode and microanode sites on the metal substrate through the electrolyte. Moreover, the water content of the protective coating significantly affects the adhesion of the coating and, at high humidities, may actually cause the coating to separate from the metal. By decreasing the permeability of the protective coating to moisture, therefore, ionic dissolution, ionic transport and diffusion, osmotic blistering, and losses of adhesion on exposure to high humidity are significantly mitigated.

Polymeric films exhibit decreasing moisture vapor transmission rate (MVTR) as their content of chemically bound chlorine increases. Pure homopolymers of vinylidene chloride, for example, comprise two chemically bound chlorine atoms for each monomer unit or more than 70 wt. %. The MVTR decreases linearly with increasing content of chemically bound chlorine so the homopolymer of vinylidene chloride has a very low permeability, on the order of 10 grams of moisture vapor through a square meter of film 25 microns thick in 24 hours. By comparison, for example, a latex film based on a polymer comprising a 1:1 ratio of methyl methacrylate and butyl acrylate has an MVTR of 1290 g/25 $\mu$/m$^2$/day.

The moisture vapor permeability and water sensitivity of vinylidene chloride copolymer films can be deleteriously affected by increasing concentrations of surfactant used in the process for preparation of the vinylidene chloride-containing polymer. In an earlier part of this disclosure, it was shown that high surfactant concentrations are also undesirable in autodeposition. Accordingly, for purposes of this invention, it is preferred that the latex used in formulating the composition and the autodepositing composition itself contain a very low concentration of surfactant or no surfactant.

The vapor permeability, as measured by cast film water vapor transmission rate (WVTR), of preferred resins is less than about 50 g/mil/m$^2$/day and preferably less than 20 g/mil/m$^2$/day. The film of these preferred resins, when applied in accordance with the preferred autodepositing method of this invention, that is, the method which utilizes an autodepositing composition containing an hydrofluoric acid/ferric fluoride activating system, provides a coated surface in which the vapor permeability, based upon improved corrosion resistance, is substantially less than that of a film cast from the same latex.

Preferred operating steps for forming resinous coatings on steel surfaces, for example, car frames made from hot rolled steel, which coatings provide excellent corrosion resistance after being subjected to salt spray (ASTM B117) for at least 168 hours include the following:

A) cleaning the steel surface, preferably to the extent that a waterbreak-free film can be formed on the surface;

B) water rinsing the cleaned surface to remove therefrom residual cleaning agent;

C) immersing the surface in the preferred pigmented coating composition, as described above, for a period of time of about 45 to about 90 seconds to form on the surface a coating having a thickness of about 0.4 to about 1.2 mil;

D) withdrawing the coated surface from the composition and, either immediately or after a partial air dry of about 30 to about 60 seconds, water rinsing the coated surface to removed therefrom residual coating composition; and E) drying the coated surface at a temperature within the range of about 20° C. to about 120° C. for a period of time of about 10 to about 30 minutes An alternative to Step (E) above is to immerse the coated part in hot water or subject it to steam as described above.

In accordance with the present invention, there is provided an autodeposited coating comprising an internally stabilized vinylidene chloride-containing resin adhered to a metallic surface, said resin comprising a plurality of polymeric molecules having a plurality of negatively charged groups in chemically bonded form, including polymeric molecules of resin contiguous to said surface chemically bonded thereto by a plurality of said negatively charged groups, and polymeric molecules of resin comprising said coating chemically bonded together through said negatively charged groups, said groups being chemically linked by metal atoms, the source of which is said metallic surface, said coated surface being essentially free of chromium and having corrosion resistance properties characterized by less than about 1 mm loss of adhesion at the scribe when subjected to 5% neutral salt spray at 95° F. ASTM B-117 for 500 hours or more. Such autodeposited coatings differ from coatings formed from autodepositing compositions containing externally stabilized resins. As pointed out in aforementioned U.S. Pat. No. 4,191,676, it is believed that autodeposited coatings formed from externally stabilized resins comprise resin molecules which are joined by metal atoms which link together negatively charged hydrophilic groups of the surfactant molecules which are adsorbed on the surfaces of different resin molecules. (The source of the metal atom is the metal substrate being coated as metal is dissolved therefrom during formation of the coating.) The joining of such resin molecules is based on physical bonding in that the surfactant is physically adhered to the surface of the resin particle. In contrast, the use of an internally stabilized resin results in a joining of the resin molecules by chemical bonding or linking of the resin molecules through the ionizable groups which are chemically attached to the resin molecule and to the metal atom, which functions to chemically link ionizable groups of different resin molecules. In addition, resin molecules are chemically linked to the metallic substrate through ionizable groups of the resin. As will be seen from examples reported hereinbelow, the adherence to the metal substrate of freshly applied coatings of this type is remarkably high, this being attributed to the formation of the aforementioned type of chemical bonding.

The term "essentially free of chromium", when used herein and in the claims, means that the autodeposited coating contains little or no chromium, and to the extent that a small amount of chromium is present in the coating, the source thereof is one other than that deriving from treatment of the uncured coating with a chromium compound-containing solution which is designed to improve the corrosion resistance of the coating.

EXAMPLES

Examples below are illustrative of the present invention. Comparative examples are set forth also.

Example 1
Autodepositing Composition

This example illustrates the formulation of an autodepositing composition of this invention. The latex used contains a vinylidene chloride copolymer which is prepared by copolymerization with a water soluble ionic stabilizer such as sodium sulfoethyl methacrylate. A composition was prepared by admixing the following:

|  | Amounts |
| --- | --- |
| Saran 143 latex | 93.0 g |
| Aquablak S (black pigment dispersion) | 3.0 g |
| hydrofluoric acid | 2.3 g |
| ferric fluoride | 3.0 g |
| deionized water | to make 1 liter. |

The Aquablak S dispersion (available from Borden) was thinned with an equal weight of deionized water to produce a consistency approximately equal to that of the latex. While stirring continuously, the latex was slowly added to the diluted black pigment dispersion. The total elapsed time of mixing to prepare a 1 liter bath is approximately one minute. The mixing time is not critical to the preparation of performance of the bath, but is mentioned here merely to point out that careful and reproducible procedures should always be used in the preparation of a coating composition to assure uniformity from batch to batch. When the black pigment dispersion has been uniformly blended with the polymer latex, deionized water is added with continuous stirring. A solution comprising the hydrofluoric acid and the ferric fluoride is added to the mixture with continuous stirring in such a volume that the blend approaches 1 liter of volume, for example, 950 ml. Deionized water is then added to bring the total volume of composition to exactly 1 liter. The resulting composition comprises 5% by weight of polymer coating solids.

Example 2
Coating and Property Evaluation

This example illustrates the coating use of the composition of Example 1 and some of the properties that are observed for the resulting coatings.

Mild steel test panels, for example, unpolished cold rolled Q-panels which are commercially available, are cut to 3-inch by 4-inch size and cleaned in heated alkaline cleaner solution by immersion or spray application or both. The panels are then rinsed with water. The panels are then immersed in the coating composition of Example 1 for 90 seconds. When the panels are removed from the coating composition, they are rinsed with water and baked for 10 minutes at 100° C.

The coated panels are then scribed and subjected to accelerated corrosion testing by exposure to 5% neutral (ASTM B-117) salt spray at 95° F. for 500 hours. After testing, the coated panels show negligible loss of adhesion at the scribe (less than 1 mm) and no failure in any form on the remainder of the panels.

The coated panels show no failure whatever when exposed to 100% relative Humidity at 95° F. for 1000 hours. When subject to 160 inch-lbs of impact with a Gardner Coverall Impact Tester using a half inch ball, the coatings show no loss whatever, even when the impacted area is vigorously tested with masking tape which is applied to the indicated area and forcefully ripped from the surface. The coatings show the same resistance to impact and tape after being subjected to a temperature of 70° C, for 10 days.

Example 3
Hardness Evaluation

The coatings of Example 2 have a uniform thickness of 0.5 mil (12.7μ). The coatings cannot be scratched by a pencil with a hardness of less than 5H–6H. The coatings show very good resistance to solvents. When subjected to the Gravelometer test in which gravel of assorted sizes is fired at the coated surface under high air pressure, the coatings rate 7-plus (where 0 represents complete failure and 10 represents no failure). When subjected to Gravelometer followed by 500 hours of salt spray testing (ASTM B-117), the coated panels still rate 6.

This represents an extraordinary advance over presently available commercial autodeposited coatings. For example, state of the art coatings 1.0 mil thick (25.4 microns) can be scratched by any pencil harder than an F which is a very soft pencil. State of the art coatings are not solvent resistant. Moreover, even when rinsed in hexavalent chromium-containing solutions to improve their corrosion resistance, presently available autodeposited coatings will, when subjected to Gravelometer followed by 500 hours of salt spray testing (ASTM B-117), give ratings of 1–2 out of a possible 10. Such low ratings represent virtually total failure, although it should be understood that this is a very severe test method.

Example 4
Solvent Evaluation

This example illustrates the excellent solvent resistance of the autodeposited coatings of Example 2. In the following table, coatings of the present invention are compared with commercially available autodeposited coatings by subjecting them to the action of various solvents frequently encountered by automobiles. The conditions used for each solvent represent the more difficult tests to which automotive manufacturers subject coatings. The pencil hardness of the coating is measured before after exposure to the solvents with the following results.

|  | Pencil Hardness After Test | |
| --- | --- | --- |
| Solvent Soak Test | State of the art coatings | Example 2 coatings |
| None | F | 5H–6H |
| Motor Oil |  |  |
| 24 hr Room Temp. | B | 5H |
| 24 hr 180° F. | HB | 5H |
| 2 hr 180° F. plus 2 hr air dry | F | 5H |
| Gasoline |  |  |
| 5 hr Room Temp. | less than 6B | 5H |
| Ethylene Glycol |  |  |
| 2 hr Room Temp. plus 2 hr air dry | HB | 3H |
| Brake Fluid |  |  |
| 30 min Room Temp. | HB | 5H |
| 16 hr Room Temp. | less than 6B | HB |

Example 5
Coating Thickness

This example shows the relationship between the coating thickness produced by immersion of mild steel panels into the composition of Example 1 and the time of immersion.

| Time of Immersion (min) | Coating Thickness (mils) |
| --- | --- |
| 1.5 | 0.45 |
| 3.0 | 0.6 |
| 5.0 | 1.0 |
| 10.0 | 1.6 |
| 30.0 | 3.0 |

Example 6
Corrosion Resistance

In this example, coatings of various thicknesses were autodeposited by immersion for various times in the composition of Example 1. The coatings were then tested in salt spray for 504 hours (ASTM B-117). With reference to the test results reported below, it should be appreciated that no autodeposited coatings have ever achieved such high corrosion resistance in the prior state of the art without the use of chromate rinses following autodeposition, nor have prior state of the art autodeposited coatings ever achieved such high corrosion resistance when baked at such a low temperature (100° C.).

|  | Salt Spray Resistance | |
| --- | --- | --- |
| Coating Thickness (mils) | Scribe* | Field* |
| 0.7 | 1 mm | 9 |
| 0.6 | 1.0–1.5 mm | 9.5 |
| 0.5 | 1–2 mm | 9 |
| 0.4 | 1.0–1.5 mm | 9 |
| 0.35 | 2.5 mm | 8 |

*The scribe ratings indicate the loss of coating at the scribe in millimeters when the panels are removed from the salt spray cabinet and immediately scraped vigorously by holding a spatula with its blade at 90° to the coated surface and scraping the coating back and forth until all loosely adhering material is removed. The above ratings are all excellent. The field ratings are based on the number and size of rust spots over the entire panel with 0 representing total failure and 10 representing no failure whatever. The above ratings are very good.

Example 7
Additional Evaluations of Corrosion Resistance

In this example, mild steel panels were immersed in a composition as described in Example 1 to produce coatings having a uniform thickness of 0.4 mil. The panels were then subjected to salt spray testing (ASTM B-117) for various lengths of time. The panels were then rated for loss of adhesion at the scribe and amounts of corrosion on the remainder of the panel. The results are as follows.

|  | Salt Spray Performance (ASTM Ratings*) | |
| --- | --- | --- |
| Hours in Salt Spray | Scribe | Field |
| 336 | 9 | 10 |
| 504 | 8.5 | 10 |
| 672 | 8 | 9 |
| 1152 | 7.5 | 7 |
| 2112 | 7.5 | 8 |

*A "0" rating indicates total failure, a 10 indicates no failure whatever.

Example 8
Resistance to Rinsing

In this example, a special method was developed to test the ability of freshly autodeposited, uncured coatings to withstand vigorous rinsing. Deionized water is directed downwardly from a narrow nozzle to impact the freshly autodeposited coating at a glancing angle. The water leaves the nozzle with a pressure of 2.5 pounds per square inch and the coated panel is located just 6 inches under the nozzle. The panel is held in a fixture at an angle of 45° from the liquid stream. If there is no sign of redispersion or loss of coating integrity after 1 minute, a sharp metal object is used to scribe a horizontal line through the wet coating to bare metal at the area which is impacted by the water to act as a "stress raiser", and the water continues to impact the autodeposited coating for another two minutes. This test is much more rigorous than the relatively less demanding needs of industrial spray rinsing.

Coatings were autodeposited from a composition like Example 1 to produce coatings of the following thicknesses: 0.35; 0.5;. 0.7; and 1.0 mil. The freshly autodeposited uncured coatings were then subjected to the above rinsability test. There wasn't any sign of failure either by redispersion or loss of coating integrity at any of the coating thicknesses tested. This test cannot be consistently passed by prior art freshly formed autodeposited coatings.

Example 9
Curing in Hot Water

This example describes the rapid, energy efficient method of curing autodeposited coatings of the present invention by hot water. Coatings of 0.5 mil thickness were formed by immersion of thick-walled hot rolled steel parts into a composition like that of Example 1. The procedure used was as follows: cleaned in hot alkaline cleaner; rinsed in tapwater; autodeposited for 90 seconds; rinsed in tapwater; and immersed for 5 seconds in water at 185° F. Coating properties such as, for example, salt spray resistance, were equivalent to those obtained by baking. After 500 hours of salt spray testing (ASTM B-117), the parts showed less than 1 mm of adhesion loss at the scribe or a rating of 9-plus out of 10, and the remainder of the part was excellent with no signs of corrosion.

The same parts required 25 minutes in a forced draft oven at 212° F. just to reach curing temperature because the mass of the steel absorbed the energy before the coating could be brought to the curing temperature.

Example 10
Curing in Steam

In this example, coatings of 0.5 mil thickness were autodeposited on cold rolled mild steel panels by immersion in a composition like that of Example 1 for 90 seconds. After removal from the coating bath, the panels were allowed to stand in air for 60 seconds to permit the supernatant coating composition to react completely with the metal surface. The panels were then rinsed in tapwater and placed in a low pressure steam chamber for curing. In two cases, oven curing was used with or without steam curing. The panels were then scribed and placed in salt spray for 168 hours and 336 hours. The following table lists the results.

|  |  | Salt Spray Performance | | | |
|---|---|---|---|---|---|
|  |  | Scribe | | Field | |
| Steam Cure Time | Oven Cure Time | 168 hr | 336 hr | 168 hr | 336 hr |
| 30 sec | — | 8 | 7 | 9 | 9 |
| 2 min | — | 8 | 7 | 9 | 9 |
| 5 min | — | 8 | 7 | 8 | 5 |
| 10 min | — | 0 | 0 | 0 | 1 |
| — | 10 min | 8 | 8 | 9 | 9 |
| 2 min | 2 min | 7+ | 7 | 9 | 9 |

Example 11
Curing at Various Temperatures

In this example, cold rolled mild steel panels were immersed in a composition like Example 1 for 90 seconds to deposit 0.9 mil of coating. The coating is very uniform and has near specular gloss. Curing of the coating can be effected at very low temperatures, for example, from room temperature to about 120° C. The following table indicates the excellent corrosion resistance which can be obtained with autodeposited coatings of this composition when cured at various temperatures.

| Curing Temperature, ° C. | Salt Spray Performance (168 hrs) ASTM B-117 Rating * |
|---|---|
| 20 | 8 plus |
| 40 | 7 |
| 50 | 8 |
| 60 | 8.5 |
| 75 | 7 |
| 90 | 8 |
| 105 | 9 |
| 120 | 9 |

* The ratings shown are for scribe only. Field performance was 10 in every case.

The salt spray results shown are excellent even though the curing temperatures used were as much as 140 to 180 centigrade degrees cooler than are possible with prior art autodeposited coatings.

The next group of examples is based on the use of vinylidene chloride copolymer latexes which are externally stabilized by anionic surfactants adsorbed to the resin particles.

Example 12
Autodepositing Composition

The following acidic aqueous coating composition was prepared by combining

|  | Amounts |
|---|---|
| latex containing about 60 wt. % solids | 167 g |
| black pigment dispersion | 5 g |
| ferric fluoride | 3 g |
| hydrofluoric acid | 2.3 g |
| water | to make 1 liter |

The resin of the latex used in the above composition comprises a copolymer of vinylidene chloride, vinyl chloride, ethylhexyl acrylate or methacrylate, an acrylic acid. The vinylidene chloride content may vary from 60 to 76 weight %. The ethylhexyl acrylate or methacrylate may vary from 4–10 weight %. The acrylic acid may vary from 1 to 4 weight %. The latex is externally stabilized by the adsorption of sodium lauryl sulfate on the resin particles. The black pigment dispersion comprises a fine particle furnace black dispersed in water by an anionic surfactant. The pigment content is 45 weight % of the dispersion. The latex has a minimum film formation temperature (MFT) of 12–15° C. A film cast from the above latex by conventional methods such as drawdown or immersion has a very low permeability (20 g/meter$^2$/25 microns/day).

Example 13
Coating and Property Evaluation

This example shows the physical properties of coatings formed by autodeposition from the composition of Example 12. Coatings were autodeposited to a film thickness of 0.9 mil in 90 seconds. After curing at 90° C. for 10 minutes, the coatings showed near specular gloss with readings of 90 to 95% reflectivity at 60° using a Gardner Colorguard meter. The coatings were impacted with a Gardner Coverall impact tester using a half-inch diameter ball at 160 inch-pounds. When the coating at the impacted area was tested by applying Scotch brand tape to the surface and then rapidly pulling it away, there was no sign of adhesive failure either by reverse or direct impact, that is, neither the concave nor the convex side of the impacted area showed any loss of adhesion. In still another physical test, the panels were bent back on themselves 180° and the bend was firmly pressed in a vise. This is sometimes called a zero-T bend. Scotch brand tape was placed in good contact with the bend and then rapidly pulled away without the slightest sign of failure of the coating. When the coating hardness was tested with pencils of varying hardness, it was found that even when the coating is air-dried, the coating cannot be scratched by anything softer than a 3H pencil.

Example 14
Autodepositing Composition

This example illustrates the formulation and deposition of high gloss, colored coatings based on the type of latex of Example 12.

|  | Amounts |
| --- | --- |
| Haloflex 202 latex | 180 g |
| Dowfax 2A1 surfactant | 0.6 g |
| Sup-R-Conc L Brilliant Red 2R pigment dispersion | 10 g |
| ferric fluoride | 3 g |
| hydrofluoric acid | 2.3 g |
| water | to make 1 liter |

The following procedure is used to prepare the above composition. Adjust the pH of the latex to 7.1 by addition of 2% ammonia solution. In a separate container, dilute the pigment with just enough deionized water to induce the paste to flow. Stir in the Dowfax 2A1 surfactant (sodium salt of an alkylated diphenyl oxide disulfonate). While agitating the latex, slowly stir in the pigment dispersion. When the color is uniform, add the water. Finally, stir in an aqueous solution containing the ferric fluoride and the hydrofluoric acid.

Immerse clean, mild steel panels in the above composition for 3 minutes to deposit 1.0 mil of coating. Cure the coating for 10 minutes at 100° C. The cured coatings are uniform, bright red, with near specular gloss.

Example 15
Corrosion Resistance

This example illustrates the high corrosion resistance of autodeposited coatings formed from a composition like that of Example 11. Clean, mild steel panels were immersed in the coating composition for 90 seconds. They were then baked at 90° C. for 15 minutes. Salt spray performance after various exposure times is shown in the following table.

| Exposure Time (ASTM B-117) | Salt Spray Performance Ratings |
| --- | --- |
| 648 hours | 8 |
| 840 hours | 8 |
| 1008 hours | 7 |

This performance is superior to that of autodeposited coatings formed from prior art compositions. Treatment with chromium solutions were not required to obtain this performance and the curing temperature used was 70 Centigrade degrees cooler than is used by current commercial autodepositing finishing lines.

Example 16
Autodepositing Composition and Corrosion Resistance

This is an example of a latex in which the poly (vinylidene chloride) particles are externally stabilized by the adsorption of surfactant: on the surface of the particles. The latex has a high vinylidene chloride content which is reflected in the density of the latex which is 10.43 lbs per gal. The low concentration of surfactant in the aqueous phase or serum is shown by the high surface tension, 52 dynes/cm.

|  | Amounts |
| --- | --- |
| Serfene 120 latex | 200 g |
| ferric fluoride | 3 g |
| hydrofluoric acid | 2.3 g |
| water | to make 1 liter |

Cold rolled, mild steel panels were treated as follows: cleaned in hot alkaline solution; rinsed with water; immersed in the above autodepositing composition for 90 seconds; allowed to stand in air for two minutes; rinsed with water; and baked for 10 minutes at 120° C. The cured coatings, which were 1.25 mils thick, were subjected to salt spray testing for various periods of time, as reported in the following table.

| Time in Salt Spray | Salt Spray Performance ASTM B-117 Ratings |
| --- | --- |
| 168 hours | 7 |
| 336 hours | 6 |
| 504 hours | 6 |
| 672 hours | 6 |
| 840 hours | 6 |

This is excellent performance despite the fact that no chromium-containing solutions were used to improve the corrosion resistance and the curing temperature was 40 to 80° Centigrade degrees lower than that used in curing prior art autodeposited coatings.

The next group of examples illustrates the preparation of various latexes which include particles of resin comprising copolymers prepared from vinylidene chloride and other monomers by emulsion polymerization reactions which include relatively small amounts of emulsifier. This group of examples illustrates also the preparation of autodepositing compositions containing the latexes and the evaluation of autodeposited coatings formed therefrom.

Examples 17 to 25
Preparation of Latexes and Evaluation of Autodepositing Compositions Including the Same There were placed in a reaction vessel 53.76 kg of demineralized water and 0.005 kg of ferrous sulfate $7H_2O$. The contents of the vessel were heated to about 30° C. and rendered oxygen-free by twice evacuating and purging with nitrogen. Thereafter 0.157 kg of emulsifier (100% sodium lauryl sulfate) was added. The following monomeric constituents were placed into a separate container: 34 kg vinylidene chloride; 0.6 kg acrylic acid; 3.4 kg methylacrylate; and 2 kg acrylonitrile. Eight kg of this 40 kg monomeric mixture were then placed in the reaction vessel. After 10 minutes of agitation, each of the following initiator solutions was added to the reaction vessel: (A) 0.3 kg of a solution consisting of 0.025 kg sodium disulfite in 2 kg of demineralized water; and (B) 0.62 kg of a solution of 0.05 kg ammonium peroxydisulfate in 4 kg of demineralized water. As a result of the heat of reaction, the temperature of the reaction mixture increased to about 35° C. At the end of the heat release, the remaining 32 kg of the mononteric mixture and the remainder of each of the aforementioned solutions were added to the reaction vessel. The monomeric mixture was added over about a 2-hour period, whereas the addition of each of the initiator solutions was completed after about 50 minutes. The addition of the monomeric mixture and initiator solutions was controlled in manner such that the reaction temperature did not increase above about 37° C. Following the end of the exotherm, and after no further refluxing, the reaction temperature was raised to 50° C. and maintained for about 30 minutes. To reduce residual monomer content, the product of reaction was distilled briefly at about 15° C. under reduced pressure. The 40% emulsion thus obtained contained less than 1 wt. % coagulate.

The above basic reaction process was utilized to polymerize other monomeric mixtures, as identified in Table 1 below, Example No. 17 being the monomeric mixture described above.

TABLE 1

| | Wt. % Based on Total Wt. of Monomer | | | | | | |
|---|---|---|---|---|---|---|---|
| Ex. No. | Vinylidene chloride | Acrylic acid | Methyl acrylate | Ethyl acrylate | Butyl acrylate | Acrylonitrile | MMA* |
| 17 | 85 | 1.5 | 8.5 | — | — | 5 | — |
| 18 | 90 | 2 | 8 | — | — | — | — |
| 19 | 90 | 2.5 | — | — | 7.5 | — | — |
| 20 | 85 | 2.5 | — | — | — | 6.2 | 6.3 |
| 21 | 90 | 1.5 | 8.5 | — | — | — | — |
| 22 | 81 | 1.5 | — | — | 8.5 | 9 | — |
| 23 | 80 | 1.5 | — | — | 13.5 | 5 | — |
| 24 | 81 | 1.5 | — | 8.5 | — | 9 | — |
| 25 | 85 | 1.5 | — | — | 8.5 | 5 | — |

*Methyl methacrylate

Autodepositing compositions were prepared from each of the latexes of Table 1 as follows. Two hundred grams of latex were diluted with 400 ml of distilled water. Fifty ml of activator solution composed of water, 15 ml of 21 percent solution of hydrofluoric acid and 4.1 gram s of ferric fluoride were diluted with about 100 ml of water and then slowly poured into the latex mixture. Distilled water was then added to make the final volume of the coating bath 1 liter. Steel panels were autophoretically coated therein, and the coatings were cured for 5 min at 100° C. without previous rinsing in a chromate solution. The coated panels were subjected to a salt spray test according to ASTM 117–73 for 120 hours. A diagonal cross (St. Andrew's cross) was scratched into the coating. The evaluation standards are as follows: (A) 1=no corrosion; (B) 2=slight corrosion along the scratch; (C) 3=corrosion also outside of the scratched area, beginning from the cross, and with cracking of the coating; (D) 4=marked under-rusting, dissolution of the coating. The results of the test are set forth in Table 2 below.

TABLE 2

| Ex. No. | Evaluation |
|---|---|
| 17 | 1–2 |
| 18 | 1–2 |
| 19 | 2 |
| 20 | 2 |
| 21 | 2 |
| 22 | 1–2 |
| 23 | 1–2 |
| 24 | 1–2 |
| 25 | 1–2 |

The above examples illustrate well important advantages which flow from use of the present invention. It should be understood that the present invention can be utilized in connection with autodeposited coatings formed on metallic surfaces other than the ferriferous surfaces which are exemplified hereinabove. Accordingly, the invention can be used widely in forming coatings on various types of metallic objects which can be used in an almost unlimited number of applications.

AMPLIFICATION OF THE DISCLOSURE

The foregoing disclosure may be amplified by the following further embodiments, which define essentially the same invention in slightly different terms and from a slightly different perspective, and which also set forth slightly variant parameters.

An amplified embodiment of this invention comprises polyvinylidene chloride dispersions for autodeposition dip lacquering in acid baths, containing the following, dispersed in water:

a copolymer comprising 70–95 wt-% vinylidene chloride and additional monomers, polymerization emulsifiers, and customary auxiliaries, characterized in that the copolymer, in addition to other comonomers, contains at least one acid comonomer with —COOH and/or —SO$_3$H groups, and the concentration of the polymer emulsifier, based on the total dispersion, amounts to 0.01–03 wt-%.

An additional embodiment is a process for the production of stabilized vinylidene chloride dispersions, characterized in that under the conditions customarily employed in the production of polyvinylidene chloride dispersions first 5–25% by weight of the total monomer mixture are subjected to emulsion polymerization in the entire volume of water and emulsifier, and then the remaining quantity of monomer and, if desired, additional polymerization initiator are added approximately in proportion to the progress of the polymerization reaction.

In one embodiment, the stabilized polyvinylidene chloride latex dispersions differ from the prior art in that a specific, extremely low emulsifier concentration is used in preparing them; the emulsifier concentration, relative to the total dispersion, preferably amounting to 0.3–0.01% by weight. Dispersions with more than 50% by weight of polymer can be produced with such low emulsifier concentrations. It is also desirable in this embodiment to adjust the solids content of the polyvinylidene chloride dispersion 25–40, preferably 30–40, % by weight.

The preferred emulsifier for the production of the stabilized latex dispersions of this embodiment is lauryl sulfate. Lauryl sulfate is defined here as also comprising sulfated coconut fatty alcohol or sulfated distillates of coconut fatty alcohol. Additional suitable emulsifiers are the sulfonation products of lauryl alcohol reacted with 2 to 5 mols of ethylene oxide or the corresponding coconut alcohols. Also suitable as emulsifiers are sulfated alkyl phenol ethers, e.g., a sulfated reaction product of nonyl phenol with 2–5 mols of ethylene oxide. Finally alkyl benzene sulfonate is a suitable polymerization emulsifier. The polymerization emulsifiers mentioned may be used individually, in mixtures, or as salts, e.g., sodium or ammonium salts.

The polyvinylidene chloride dispersions in accordance with this embodiment, of the invention contain at least one copolymer with acid groups polymerized into the polymer composition. In this embodiment's process comonomers with the carboxyl groups or with sulfonic acid groups or monoesters of sulfuric acid may be used. The acid group-containing monomers are used in quantities of 0.5–4, preferably 1–2, % by weight based on the weight of the copolymer. Acrylic acid is preferred as the acid group-containing monomer because of its good copolymerizability with vinylidene chloride. However it is also possible to use methacrylic acid, itaconic acid, hemi-esters of maleic acid with $C_{1-4}$ alcohols, hemi-esters of fumaric acid, or crotonic acid. Additional suitable acid group-containing monomers are: vinyl sulfonic acid, 2-acrylamido-2-methyl propane sulfonic acid or 2-acryloyl- or 2-methacryloyl-ethane-sulfonic acid or -propane sulfonic acid. All of the acids mentioned can be used a, such or in the form of their lithium, sodium, potassium or ammonium salts.

The polymer on which the stabilized polyvinylidene chloride latex dispersion in accordance with this embodiment of the invention is based also consists of additional comonomer building blocks. Thus acrylonitrile may also be used in a preferred embodiment of the invention. The quantity of acrylonitrile used may be up to about 25, preferably 1–8, most preferably 3–6, % by weight based on the weight of the copolymer.

In accordance with a further embodiment of the invention vinyl chloride can be used. In addition esters of acrylic acid or methacrylic acid are suitable as comonomers. Thus the esters of these acids with methanol, ethanol, propanol, isopropanol, butanol, ethylhexanol, e.g., 2-ethylhexanol, or hexanol can be used. Additional suitable esters of acrylic or methacrylic acid include, for example, 2-hydroxyethyl acrylate or methylacrylate or 2-hydroxypropyl acrylate. In addition to these compounds, acrylamide and substituted acrylamides, for example N-butyl-acrylamide, or in general N-alkylacrylamides with 2–4 C atoms in the alkyl substituent may be used.

In any case, the composition of the polymers on which the stabilized latex dispersions in accordance with this embodiment of the invention is based is to be selected such that the vinylidene chloride content is 70–95, preferably 80–90, % by weight based, on the total polymer weight.

The preparation of the stabilized polyvinylidene chloride latex dispersions in accordance with this embodiment of invention is preferably performed using a modified monomer inflow process. This process provides that the entire quantity of water and the quantity of emulsifier be placed in advance under nitrogen in a reaction vessel and emulsion polymerization started with part of the initiator plus 5–30, preferably 10–20, % by weight of the total quantity of monomer. This emulsion polymerization is continued up to a conversion rate of greater than 80%. After this the residual monomer quantity is added continuously or batchwise. It is preferred to adapt the addition rate to the course of the reaction, i.e., in particular to add it as rapidly, as the monomers are copolymerized. In the process in accordance with the invention the monomers can be added as mixtures or, if necessary on the basis of the copolymerization parameters, separately and at different addition rates. Other details of this type of emulsion copolymerization are generally known in the art.

Polyvinylidene chloride latex dispersions produced in accordance with this embodiment of the process of the invention are essentially free from undesirable coagulate. This is astonishing, since extremely small quantities of emulsifier are used in comparison to known processes in the art.

Initiators customarily used in the emulsion polymerization of vinylidene chloride can be employed in the production process in accordance with embodiment of the invention. For example, redox initiators on the basis of potassium or ammonium peroxy-disulfate/sodium sulfite may be employed. In addition organic peroxides, e.g., cumene hydroperoxide, or water-soluble azo compounds may be used. To produce autodeposition baths, the polymer dispersions in accordance with this embodiment of the invention are substituted in equal quantities (based on the polymer) for known latex dispersions. Specifically the dispersions are first diluted with water until a polymer content of 3–15, preferably 5–10, % by weight becomes established after addition of all other components. Then if desired a pigment such as carbon black in dispersion is added and mixed with a customary starter solution. Such starter solutions may contain, for example, hydrofluoric acid, its iron salts, and oxidizing agents such as $H_2O_2$. Measurement of the redox potential is generally performed to test the baths. An advantageous value for the redox potential is between −300 and −400 m.v.

To obtain tire autodeposition coating according to this embodiment, a metal sheet cleaned according to the usual methods, made of zinc, aluminum or preferably steel, is immersed in the bath for 20 to 200 sec. The layer thickness achieved depends on the immersion time. The wet films thus produced may be cured in the usual manner. In general a heat treatment cure at temperatures of approximately 80° C. is performed.

COMPARISON EXAMPLES C-1 and C-2

Examples 18 and 19 were repeated except that instead of 0.157 kg of lauryl sulfate emulsifier, 1.60 kg was used, and the volume of water was correspondingly reduced. The result was a non-stabilized (i.e., prior art) polyvinylidene chloride latex, as is demonstrated by the following.

Autodeposition baths were prepared in the same manner as Examples 18 and 19, only with the products of Example C-1 and C-2, and tested on steel sheets in the identical manner. The results were as follows:

TABLE 3

| Example No. | Evaluation |
| --- | --- |
| C-1 | 3 |
| C-2 | 3–4 |

Comparing Tables 2 and 3, it is clear that the maximum amount of emulsifier is critical, which would not be expected from the prior art. These results are in accordance with the comments regarding critical micelle concentration, infra.

What is claimed is:

1. An autodepositing composition comprising an acidic aqueous solution of an acid/oxidizing system consisting essentially of hydrofluoric acid and a soluble ferric iron-containing compound and having dispersed therein resin solids of an internally stabilized vinylidene chloride copolymer comprising the following polymerized constituents:

(A) between 45 and about 99 wt. % based on the total weight of monomers used of vinylidene chloride monomer;

(B) from about 0.5 to 30 wt. % based on the total weight of (A) and (B) hereof of a second relatively more hydrophilic ethylenically unsaturated monomeric material, wherein such monomeric material has a solubility in both the water phase and the oil phase of the polymer latex of at least 1 wt. % at the temperature of polymerization; and (C) from about 0.1 to about 5 wt. % based on the total weight of other monomers of an ionic significantly water-soluble material which is co-polymerizable with the material (B) hereof and is selected from the group of sulfonic acids and their salts having the formula:

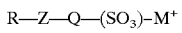

R—Z—Q—(SO$_3$)-M$^+$ wherein "R" is selected from the group consisting of vinyl and substituted vinyl; "Z" represents a difunctional linking group which is capable of activating the double bond in the vinyl group; —Q— is a divalent hydrocarbon having its valence bonds on different carbon atoms; and the "M$^+$" represents a cation; wherein said composition is capable of forming on a steel surface an autodeposited coating which, in its cured form, is essentially free of chromium, said essentially chromium-free cured coating having corrosion-resistant properties characterized by less than about 1 mm loss of adhesion at the scribe when subjected to 5% neutral salt spray at 95° F. ASTM B-117 for 500 hours or more.

2. A composition according to claim 1 wherein constituent (C) consists essentially of sodium sulfoalkyl methacrylate.

3. A composition according to claim 1 wherein the source of the soluble ferric iron-containing compound is ferric fluoride.

4. A composition according to claim 2 wherein the source of the soluble ferric iron-containing compound is ferric fluoride.

5. A composition according to claim 1 wherein the vapor permeability of said copolymer is less than 50 g/mil/m$^2$/day.

6. A composition according to claim 4 wherein the vapor permeability of said copolymer is less than 50 g/mil/m$^2$/day.

7. A composition according to claim 3 wherein the vapor permeability of said copolymer is less than 50 g/mil/m$^2$/day.

8. A composition according to claim 1 wherein said permeability of said copolymer is less than 20 g/mil/m$^2$/day.

9. A composition according to claim 2 wherein said permeability of said copolymer is less than 20 g/mil/m$^2$/day.

10. A composition according to claim 3 wherein said permeability of said copolymer is less than 20 g/mil/m$^2$/day.

11. A composition according to claim 1 wherein said copolymer consists essentially of about 50 to about 90 wt. % of vinylidene chloride, about 5 to about 30 wt. % butyl acrylate and about 1 to about 2 wt. % of sulfoethyl methacrylate.

12. A composition according to claim 1 wherein said copolymer includes polymerized sulfoethyl methacrylate.

13. A composition according to claim 12 wherein said copolymer includes also polymerized vinyl chloride and at least one acrylic monomer.

14. A composition according to claim 13 wherein said copolymer includes more than one polymerized acrylic monomer.

15. A composition according to claim 1 wherein said copolymer consists essentially of less than 70 wt. % vinylidene chloride, about 15 to about 20 wt. % vinyl chloride, about 2 to about 5 wt. % butyl acrylate, about 3 to about 10 wt. % acrylonitrile, and about 1 to about 2 wt. % sulfoethyl methacrylate.

16. A composition according to claim 1 which includes a crystalline vinylidene chloride copolymer.

17. A composition according to claim 1 wherein said copolymer includes at least about 80 wt. % vinylidene chloride.

18. A composition according to claim 16 wherein said crystalline vinylidene chloride copolymer includes at least about 80 wt. % of vinylidene chloride.

19. A composition according to claim 1 wherein said copolymer includes polymerized methacrylic acid.

20. A composition according to claim 1 wherein said copolymer includes polymerized methyl methacrylate.

21. A composition according to claim 1 wherein said copolymer includes a polymerized monomer selected from the group consisting of hydroxyethylmethacrylate, ethyl hexylacrylate, acrylic acid, acrylonitrile, methacrylonitrile, acrylamide, and the lower alkyl and diallkylacrylamides, acrolein, methylvinyl ketone, and vinyl acetate.

22. A composition according to claim 1 wherein said copolymer includes the polymerized material of (C) above in which the Z of said formula is selected from the group consisting of

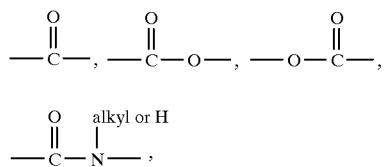

and wherein said alkyl has 1 to 8 carbon atoms.

23. A composition according to claim 1 wherein said copolymer includes the polymerized form one or more comonomers selected from the group consisting of vinyl chloride, acrylic acid, methyl acrylate, ethyl acrylate, butyl acrylate, methacrylic acid, methyl methacrylate, acrylonitrile, methacrylonitrile, acrylamide, and methacrylamide and the polymerized material of (C) above in which the Z of said formula is selected from the group consisting of

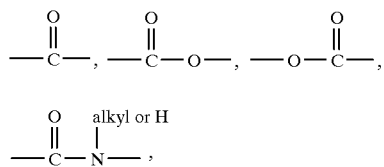

and wherein said alkyl has 1 to 6 carbon atoms.

24. An autodepositing composition according to claim 1 wherein said copolymer includes at least about 50 wt. % of said vinylidene chloride.

25. An autodepositing composition according to claim 3 wherein said copolymer includes at least about 50 wt. % of said vinylidene chloride.

26. An autodepositing composition according to claim 4 wherein said copolymer includes at least about 50 wt. % of said vinylidene chloride.

27. An autodepositing composition according to claim 5 wherein said copolymer includes at least about 50 wt. % of said vinylidene chloride.

28. An autodepositing composition according to claim 10 wherein said copolymer includes at least about 50 wt. % of said vinylidene chloride.

29. An autodepositing composition according to claim 13 wherein said copolymer includes at least about 50 wt. % of said vinylidene chloride.

30. An autodepositing composition according to claim 14 wherein said copolymer includes at least about 50 wt. % of said vinylidene chloride.

31. An autodepositing composition according to claim 21 wherein said copolymer includes at least about 50 wt. % of said vinylidene chloride.

32. An autodepositing composition according to claim 22 wherein said copolymer includes at least about 50 wt. % of said vinylidene chloride.

33. An autodepositing composition according to claim 23 wherein said copolymer includes at least about 50 wt. % of said vinylidene chloride.

* * * * *